(12) United States Patent
Debouk et al.

(10) Patent No.: US 10,394,241 B2
(45) Date of Patent: Aug. 27, 2019

(54) MULTI-STAGE VOTING CONTROL

(71) Applicant: GM GLOBAL TECHNOLOGY OPERATIONS LLC, Detroit, MI (US)

(72) Inventors: Rami I. Debouk, Dearborn, MI (US); Gurmitsingh M. Banvait, Warren, MI (US); Padma Sundaram, West Bloomfield, MI (US); Samuel E. Graham, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 310 days.

(21) Appl. No.: 15/623,686

(22) Filed: Jun. 15, 2017

(65) Prior Publication Data

US 2018/0364712 A1    Dec. 20, 2018

(51) Int. Cl.
*G06F 11/18*   (2006.01)
*G05D 1/00*   (2006.01)

(52) U.S. Cl.
CPC ......... *G05D 1/0088* (2013.01); *G05D 1/0077* (2013.01)

(58) Field of Classification Search
CPC .. G05D 1/0088; G05D 1/0077; G05D 1/0055; G05D 1/0072; B60T 2270/413; B60T 2270/40; B60T 2270/403; B60T 2270/404; B60T 2270/406; B60T 2270/408; G06F 11/181; G06F 11/182; G06F 11/183; G06F 11/184; G06F 11/185; G06F 11/186; G06F 11/187

USPC ........... 701/3, 22, 36, 48, 45, 49, 70; 714/11
See application file for complete search history.

(56) References Cited

U.S. PATENT DOCUMENTS

| | | | | |
|---|---|---|---|---|
| 8,761,696 | B2 * | 6/2014 | Mirzaei | G01F 1/32 375/296 |
| 8,761,969 | B2 * | 6/2014 | Sghairi | B64C 13/24 701/4 |
| 9,772,897 | B1 * | 9/2017 | Ahmad | G06F 11/16 |
| 2005/0228546 | A1 * | 10/2005 | Naik | B60T 8/885 701/1 |
| 2006/0116803 | A1 * | 6/2006 | Armbruster | G05B 9/03 701/48 |
| 2008/0086241 | A1 * | 4/2008 | Phillips | G05D 1/0038 701/2 |
| 2009/0031198 | A1 * | 1/2009 | Johansson | G06F 11/182 714/799 |
| 2010/0222943 | A1 * | 9/2010 | Sghairi | B64C 13/503 701/4 |

(Continued)

*Primary Examiner* — Richard A Goldman
(74) *Attorney, Agent, or Firm* — Lorenz & Kopf, LLP (57) ABSTRACT

Systems and methods are provided for effecting control through multi-stage voting. A control system may be in communication with an actuator device responsive to a voted command. A multi-stage voting system may be configured to determine the voted command. A set of controllers and a monitor controller may provide commands to the multi-stage voting system. The multi-stage voting system includes logic with a first stage that compares the commands of the set of controllers to each other, and a second stage that compares at least one of those commands to the monitor command. The multi-stage voting system delivers the voted command to the actuator device based on the comparisons made in the first and second stages. The actuator device effects an operation in response to the voted command.

20 Claims, 8 Drawing Sheets

(56) References Cited

U.S. PATENT DOCUMENTS

| | | | | |
|---|---|---|---|---|
| 2010/0243388 A1* | 9/2010 | Holzwarth | ............... | B60T 8/885 188/158 |
| 2011/0106339 A1* | 5/2011 | Phillips | ................ | G05D 1/0033 701/2 |
| 2013/0124019 A1* | 5/2013 | Fukui | ...................... | G06F 17/00 701/3 |
| 2013/0311006 A1* | 11/2013 | Ahmad | .................. | B64C 19/00 701/3 |
| 2014/0002605 A1* | 1/2014 | Liao | ........................ | G06T 5/005 348/46 |
| 2014/0088800 A1* | 3/2014 | Mercer | .................. | B64D 43/02 701/14 |
| 2014/0114557 A1* | 4/2014 | Nutaro | ................... | G01C 21/00 701/121 |
| 2014/0172203 A1* | 6/2014 | White | .................. | B64C 13/503 701/4 |
| 2014/0344013 A1* | 11/2014 | Karty | ................ | G06Q 30/0201 705/7.29 |
| 2015/0073630 A1* | 3/2015 | Downs, Jr. | ................ | B60L 3/12 701/22 |
| 2018/0364712 A1* | 12/2018 | Debouk | ............... | G05D 1/0077 |

* cited by examiner

MULTI-STAGE VOTING CONTROL

TECHNICAL FIELD

The present disclosure generally relates to control systems and methods, and more particularly relates to multi-stage voting in control systems.

INTRODUCTION

A high integrity capability may contribute to the quality of a system. For example, a system that continues to operate correctly in the event a fault occurs may have a high level of product reliability. The integrity level of a system may be improved through hardware systems such as redundancy, where the replication of components provides a backup source for execution. For example, in the case of a system that uses the output from a sensor, two independent sensors may be used to provide the required output, so that a backup source exists.

An autonomous vehicle is a vehicle capable of sensing its environment and navigating with little or no user input. Accordingly, high integrity is desirable. An autonomous vehicle senses its surroundings using devices such as radar, lidar, image sensors, and the like. An autonomous vehicle also senses the state of many aspects of its operating systems. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Automation may be provided through automatic control systems, which process large amounts of information, make determinations, and execute commands.

Accordingly, it is desirable to provide systems and methods that provide high integrity control systems for applications such as an autonomous vehicle. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for multi-stage voting control. In various embodiments, a control system may be in communication with an actuator device that is responsive to a voted command. A multi-stage voting system may be configured to determine the voted command. A set of controllers and a monitor controller may provide commands to the multi-stage voting system. The multi-stage voting system includes logic with a first stage that compares the commands of the set of controllers to each other, and a second stage that compares at least one of those commands to the monitor command. The multi-stage voting system delivers the voted command to the actuator device based on the comparisons made in the first and second stages. The actuator device effects an operation in response to the voted command.

In another embodiment, the set of commands includes two commands and the first stage evaluates whether the two commands are in agreement with one another.

In another embodiment, the set of commands includes three commands and the first stage evaluates whether the three commands are in agreement with one another. When all three commands agree with one another, the first stage delivers a first output command to the second stage. When only two of the three commands agree, the first stage delivers a different output command to the second stage.

In another embodiment, the second stage evaluates whether the first output command agrees with the monitor command. When the first output command and the monitor command do not agree with one another, the second stage delivers a degraded command effecting a change in operation of the actuator device.

In another embodiment, when the first output command and the monitor command do not agree with one another as determined by the second stage, the second stage delivers a predetermined command to the actuator device. The predetermined command is retrieved from a computer readable storage device or media of the control system and is configured to match an operational need of the actuator device.

In another embodiment, the second stage evaluates whether the first output command agrees with the monitor command within a threshold. The threshold allows variation between the first output command and the monitor command.

In another embodiment, the first stage evaluates whether first and second commands agree with one another. The second stage determines whether the first command and the second command agree with the monitor command. The second stage issues the second command as a voted command when the first command does not agree with the monitor command and the second command does agree with the monitor command.

In another embodiment, the second stage issues an alternative command as the voted command either when the first command does not agree with the second command, or when the first command does not agree with the monitor command and the second command does not agree with the monitor command.

In other embodiments, methods include operating a control system to issue a voted command to an actuator device. First and second controllers are provided along with a monitor controller. A first signal is received from the first controller wherein the first signal represents a first command. A second signal is received from the second controller wherein the second signal represents a second command. The second controller may be substantially identical to the first controller. A monitor signal is received from the monitor controller, wherein the monitor signal represents a third command. The monitor controller may be configured different from the first and second controllers. A processor processes the first and second signals using a multi-stage voting system, wherein the multi-stage voting system includes a first stage and a second stage. In the first stage, the processor compares the first signal to the second signal. In the second stage, the processor compares the monitor signal to at least one of the first signal or the second signal. When the monitor signal agrees with the first or second signal, a command signal is issued as the voted command from the multi-stage voting system to the actuator device. The command signal corresponds to at least one of the first or second signals.

In another embodiment, the first and second controllers are programmed the same and the monitor controller is programmed differently.

In another embodiment, the first stage is executed in a first stage voting module of the processor and the second stage is executed in a second stage voting module of the processor.

In another embodiment, a command signal is provided from the first stage voting module to the second stage voting module. The command signal represents agreement between the first command and the second command. An alternative signal is issued from the multi-stage voting system to the actuator device when the first signal does not agree with the second signal, or when the monitor signal is not in agreement with the first or second signal. The alternate signal represents a predetermined command based on an operational need of the actuator device.

In another embodiment, a third signal is received from the third controller. The processor compares the first, second and third signals with one another. When the first, second and third signals agree with one another, a first command signal is issued from the first stage voting module to the second stage voting module. When only two of the first, second and third signals agree with one another, a second command signal is issued from the first stage voting module to the second stage voting module, where the second command signal is different than the first command signal.

In another embodiment, an alternative signal is issued from the second stage voting module to the actuator device in response to the second command signal. The alternative signal is predetermined and stored in the control system.

In another embodiment, a third signal is provided by a third controller. The processor compares the first, second and third signals with one another. An alternative signal is issued from the second stage voting module to the actuator device when none of the first, second and third signals agree with one another.

In another embodiment, the first and second signals are compared with one another and with the monitor signal. The processor issues an alternative command to the actuator device when the first signal does not agree with the second signal or when the monitor signal does not agree with the second signal.

In another embodiment, a signal is provided from a sensor device to both the first and second controllers.

In another embodiment, the actuator device actuates a vehicle system of an autonomous vehicle. The vehicle system is operated by the actuator device in response to a signal from a sensor device. The signal from the sensor device is processed by the processor through the multi-stage voting system.

In another embodiment, a third signal is provided from the third controller to the multi-stage voting system. The processor compares the first, second and third signals with one another. When all the first, second and third signals agree with one another, a first output signal is issued from the first stage to the second stage. When only two of the first, second and third commands agree with one another, a second output signal, different from the first output signal, is issued from the first stage to the second stage.

In additional embodiments, a control system with multi-stage voting is provided for an autonomous vehicle. A vehicle system operates a function of the autonomous vehicle. An actuator device communicates with and actuates the vehicle system. The control system communicates with the actuator device. A multi-stage voting system is configured to determine a voted command for the actuator device, where the voted command is established for control of the autonomous vehicle. A set of controllers receives inputs from the autonomous vehicle and provides a set of command signals to the multi-stage voting system. A monitor controller receives inputs from the autonomous vehicle and provides a monitor signal to the multi-stage voting system. The multi-stage voting system includes logic in the control system, with a first stage that compares the set of command signals to each other, and a second stage that compares a command signal in the set of command signals to the monitor signal. The multi-stage voting system delivers the voted command to the actuator device based on the comparisons made in the first and second stages.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
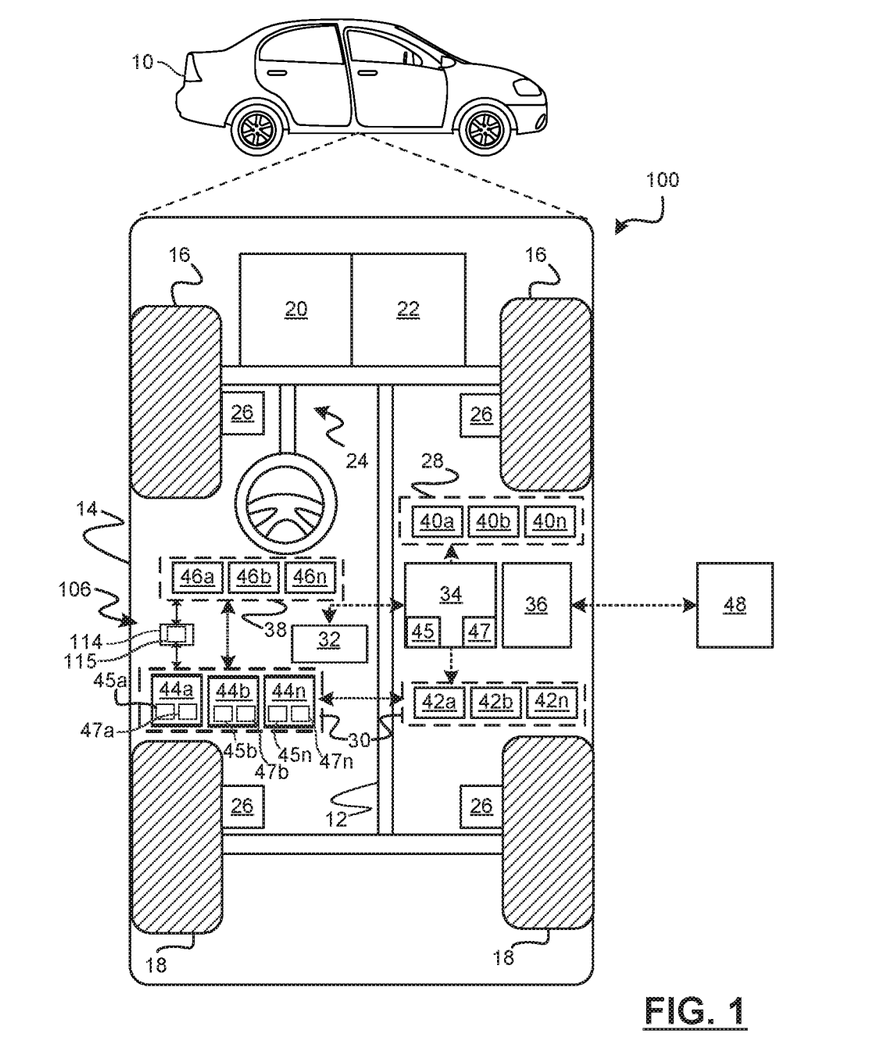
FIG. 1 is a functional block diagram illustrating a control system of an autonomous vehicle employing methods, in accordance with various embodiments.

With reference to FIG. 1, a control system shown generally at 100 is associated with a vehicle 10 in accordance with various embodiments. In general, commands for operations and functions of the vehicle 10 are provided with high-performance and high-integrity execution through the control system 100. A voting system 106 is employed to confirm the integrity of the control system 100. For example, the voting system 106 confirms that a command, such as one sent to an actuator, is the correct command given the current driving situation. Based on the confirmation, the voting system 106 determines a control output. For example, the command of one of a plurality of controllers may be selected for use, or an alternate command may be generated as further described below. While described below in relation to certain embodiments, the control system 100 and methods described in relation to FIGS. 1-8, may be applied to a wide variety of command processing applications.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry occupants from one location to another. The vehicle 10 is depicted in the illustrated embodiment as a passenger car, but it should be appreciated that the systems, processes and methods described herein may be used in any other vehicle type. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 has various vehicle systems that generally include a propulsion system 20, a transmission system 22, a steering system 24, a brake system 26, a sensing system 28, an actuator system or systems 30, at least one data storage device 32, at least one electronic control unit 34, a communication system 36, and a sensor system 38. The propulsion system 20 may, in various embodiments, include an internal combustion engine, an electric machine such as a traction motor, and/or a fuel cell propulsion system. The transmission system 22 may be configured to transmit power from the propulsion system 20 to one or more of the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the vehicle wheels 16, 18. While depicted as including a steering wheel for illustrative purposes, in some embodiments contemplated within the scope of the present disclosure, the steering system 24 may not include a steering wheel.

The sensing system 28 includes one or more sensing devices 40a-40n that sense observable conditions of the exterior environment of the autonomous vehicle 10. The sensing devices 40a-40n may include, but are not limited to, radars, lidars, global positioning systems, optical cameras, thermal cameras, ultrasonic sensors, and/or other sensors. The actuator system 30 includes one or more actuator devices 42a-42n that control one or more vehicle operations or features such as, but not limited to, the propulsion system 20, the transmission system 22, the steering system 24, or the brake system 26. The actuator devices 42a-42n may each be communicatively coupled with a controller 44a-44n and the electronic control unit 34. Each of the controllers 44a-44n may be integrated with its respective actuator device 42a-42n, may be a part of the electronic control unit 34, or may be located in another location of the autonomous vehicle 10. A monitor controller 114 may be communicatively coupled with the controllers 44a-44n, the sensor system 38, and/or with other parts of the control system 100, may include a processor 115, and is further described below. The controllers 44a-44n, in addition to controlling the actuator devices 42a-42n, may support any number of additional operations and functions in the autonomous vehicle 10. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. In an exemplary embodiment the communication system 36 is configured to communicate with in-vehicle occupants such as through spoken message delivery/speech synthesis and speech recognition.

The sensor system 38 includes any number of sensors 46a-46n to detect events, states, changes, or conditions for various operations, fractions, or parts of the autonomous vehicle 10, or its environment. Information from the sensors 46a-46n is provided as inputs to the electronic control unit 34 and/or to the controllers 44a-44n, or the monitor controller 114. The sensors 46a-46n may include for example, a steering angle sensor, a yaw rate sensor, wheel speed sensors, accelerometers, various sensors for the propulsion system 30, a vehicle speed sensor, various temperature sensors, position sensors, etc. The electronic control unit 34 and/or the controllers 44a-44n and/or the monitor controller 114 may accept information from the sensor system 38, process that information, and provide control commands based thereon to effect outcomes such as operation of the vehicle systems through the actuator devices 42a-42n.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the electronic control unit 34, separate from the electronic control unit 34, part of one or more of the controllers 44a-44n, 114, or part of multiple systems. The electronic control unit 34 includes at least one processor 45 and a computer readable storage device or media 47. Each of the controllers 44a-44n may also include or use a processor 45a-45n and/or a computer readable storage device or media 47a-47n. The processors 45, 45a-45n and 115 may be any custom made or commercially available processor, a central processing unit (CPU), a graphics processing unit (GPU), an auxiliary processor among several processors associated with the electronic control unit 34 and the controllers 44a-44n, a semiconductor based microprocessor (in the form of a microchip or chip set), a macroprocessor, any combination thereof, or generally any device for executing instructions. The processors 45a-45n and 115 are further described below. The computer readable storage device or media 47 may include volatile and nonvolatile storage in read-only memory (ROM), random-access memory (RAM), and keep-alive memory (KAM), for example. KAM is a persistent or non-volatile memory that may be used to store various operating variables while the processors 45 are powered down. The computer-readable storage device or media 47 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the electronic control unit 34/controllers 44a-44n/monitor controller 114, in controlling the autonomous vehicle 10.

The instructions may include one or more separate programs, each of which comprises an ordered listing of executable instructions for implementing logical functions. The instructions, when executed by the processors 45, 45a-45n, 115 receive and process signals from the sensing systems 28 and sensor system 38, perform logic, calculations, methods and/or algorithms for automatically controlling the components of the autonomous vehicle 10. The processors 45 may generate control signals for the actuator system 30 to automatically control the components of the autonomous vehicle 10 based on the logic, calculations, methods, and/or algorithms. Embodiments of the autonomous vehicle 10 may include any number of electronic control units 34 and/or controllers 44a-44n, which communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
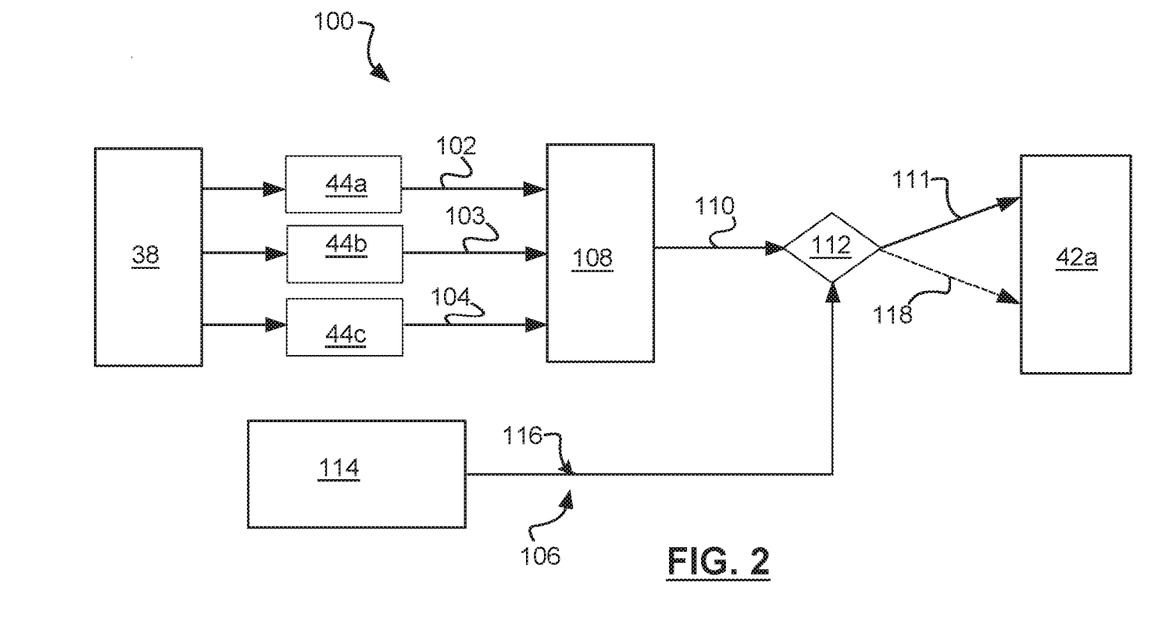
FIG. 2 is a logic block diagram illustrating a part of a control system employing methods, in accordance with various embodiments.

In various embodiments, one or more instructions are embodied in the control system 100 and, when executed by the processors 45, 45a-45n, 115, effect the multi-stage voting process 106 to deliver the correct command for an assigned operation. With reference to FIG. 2, an exemplary embodiment of the control system 100 is illustrated. The control system 100 includes a set of controllers 44a, 44b and 44c. In this example, the assigned operation is delivery of a command as an input to the actuator device 42a to effect a response for the assigned operation. For purposes of the current example, the controllers 44a, 44b and 44c may be substantially identical devices with common program coding for the assigned operation, providing hardware redundancy. The controllers 44a, 44b and 44c each include high performance processors 45a, 45b, 45c (shown in FIG. 1), that have a combination of capability and optimized use of resources. The controllers 44a, 44b, 44c receive the same inputs, independently determine an output, and provide command signals representing commands 102, 103 and 104 respectively, to carry out the assigned operation. The commands 102-104 may be processed through the multi-stage voting system 106. In this embodiment the multi-stage voting system 106 is implemented by the processors 45a, 45b, 45c and the processor 115 in first and second stages 108, 112 in one or more function sub-units or modules as further described below. In the first stage 108, the three commands 102-104 are compared to determine whether they are consistent with one another. If two or more of the commands 102-104 agree, a command signal representing a command 110 results, and is delivered to the second stage 112 for further processing. It should be appreciated that command 110 is the same as one of the commands 102-104 that is among the two or three commands in agreement. The terms agree or agreement when used as between commands, means that the commands are identical or substantially identical, so as to have no significant variation within the context of the assigned operation.

In a number of examples, the monitor controller 114 separately provides a monitor signal representing a monitor command 116 to the second stage 112 of the multi-stage voting system 106. The monitor controller 114 and its processor 115 (shown in FIG. 1), are high integrity devices. The monitor controller 114 may have a unique architecture as compared to the controllers 44a, 44b and 44c, may include additional diagnostics such as the ability to verify code is correctly executed by the hardware, and may be designed to withstand more severe environmental conditions. The monitor controller 114 may use a logically equivalent but diverse set of inputs. In some examples data diversity may be achieved by re-expressing inputs in the monitor controller 114, prior to processing. In other examples, inputs may be provided from a unique set of the sensors 46a-46n of the sensor system 38. The monitor controller 114 may use different, functionally equivalent software that may be designed using different algorithms as compared to the controllers 44a, 44b, 44c. The diverse handling of the assigned operation by the monitor controller 114 delivers the monitor command 116. Use of logic in the monitor controller 114 that differs from that of the controllers 44a, 44b and 44c enables detecting systematic faults while the controllers 44a, 44b and 44c may detect random hardware faults.

In the second stage 112 of the multi-stage voting system 106, the commands 110 and 116 are compared through the conditional expression: (if |command 110−monitor command 116|<T), where T is a threshold difference determined for the assigned operation. Use of the threshold T, allows for some variation, but requires the commands to be substantially identical, so as to have no significant variation in the context of the assigned operation. When command 110 is in agreement with monitor command 116, within the threshold difference, the second stage 112 issues a command signal representing voted command 111 to the actuator device 42a. In so doing, the second stage 112 uses monitor command 116 to confirm that the command 110 is the correct command for the assigned operation and command 110 is delivered as voted command 111.

Returning to the first stage 108, in the event that there is no agreement among at least two of the controllers 44a, 44b, 44c, the first stage 108 will not issue the command 110. In the absence of the command 110, or in the absence of agreement in the second stage 112 between the command 110 and the monitor command 116 (within the threshold T), the second stage 112 issues an alternative signal representing alternate command 118 as an input to the actuator device 42a. In a number of examples, the alternate command 118 is predetermined for the specific situation and may be referenced such as from a lookup table, or from another data format stored in memory. In other examples, the cause of the lack of agreement, may dictate a change in operation of the vehicle system. For example, rather than operating in a normal mode, the alternate command 118 may be a command for the actuator device 42a to operate in a degraded mode. Degraded mode is a fallback mode that allows continued operation of the actuator device 42a but with changes. The extent of the changes depends on the significance of the cause. In some degraded modes no change in performance is perceivable. In more significant examples, performance may be modified. Accordingly, the multi-stage voting system 106 processes three commands 102-104 in the first stage 108, and processes two commands 110, and 116 in the second stage 112, to deliver either voted command 111, or alternate command 118 to an actuator device 42a for control thereof. The two stage voting process 106 or parts thereof may be implemented by the monitor controller 114, the controllers 44a-44n, the electronic control unit 34, another controller, or a combination of controllers.

Figure 3:
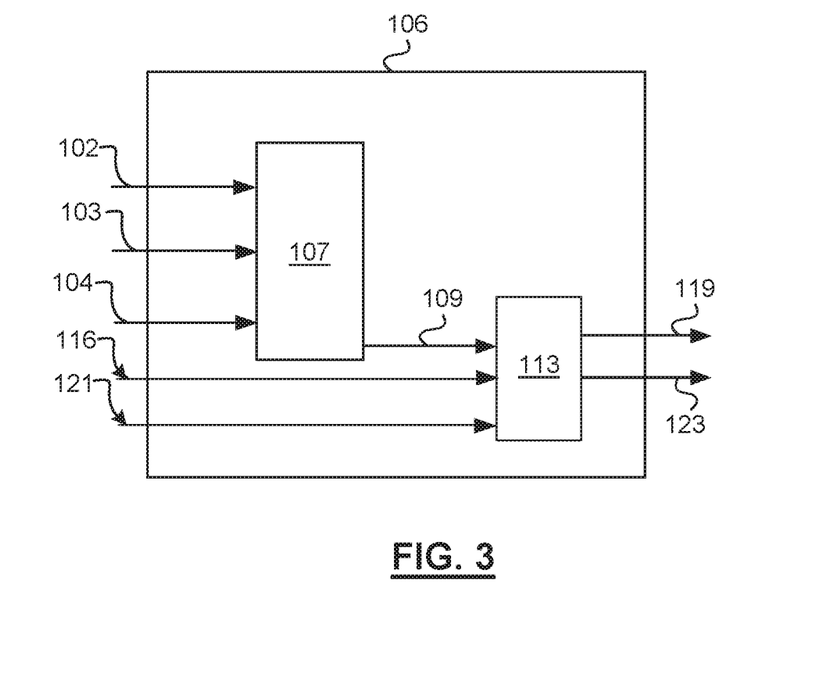
FIG. 3 is a dataflow diagram illustrating a multi-stage voting system that includes a part of the control system of the autonomous vehicle of FIG. 1, in accordance with embodiments of FIG. 2.

With reference to FIG. 3, a functional block diagram is shown with dataflows that illustrate, in one example, various operational aspects of a multi-stage voting system 106. The multi-stage voting system 106 may be considered to implement one or more functional sub-units or modules, including a first stage voting module 107 where the first stage 108 is executed, and a second stage voting module 113 where the second stage 112 is executed. As can be appreciated, the modules 107, 113 shown in FIG. 3 may be combined and/or further partitioned to similarly operate according to the functions described herein.

The first stage voting module 107 initiates operation upon receipt of command signals representing the commands 102, 103 and 104 form the controllers 44a, 44b and 44c. In the first stage 108, the three commands 102-104 are compared, such as by a processor 45a, 45b, 45c or 45 in a first stage voting module 107 thereof, to determine whether they are consistent with one another. When the first stage voting module 107 determines that two or more of the commands 102-104 are in agreement, a command signal 109 is provided to the second stage voting module 113. The second stage voting module 113 may also be implemented in any or a combination of the processors 45a, 45b, 45c, 45 or 115. The monitor controller 114 separately provides a monitor signal representing the monitor command 116 to the second stage voting module 113. The second stage voting module 113 compares the command signals 109 and 116, such as described above. When command signal 109 is in agreement with the signal representing the monitor command 116, within the threshold difference, the second stage voting module 113 provides a control signal 119 to the actuator device 42a to undertake the voted command 111.

In the absence of the command signal 109, or in the absence of agreement in the second stage voting module 113 between the command signal 109 and the signal representing the monitor command 116 (within the threshold T), the second stage voting module 113, provides the alternate command 118 through a control signal 123 provided as an input to the actuator device 42a. For example, the second stage voting module 113 also receives input data 121, such as from the computer-readable storage device or media 47. The second stage voting module 113 provides the control signal 123 from among the available commands in the input data 121 and specifically, the available command corresponding to the monitor command 116, for delivery to the actuator 42a via control signal 123 as the alternate command 118.

Figure 4:
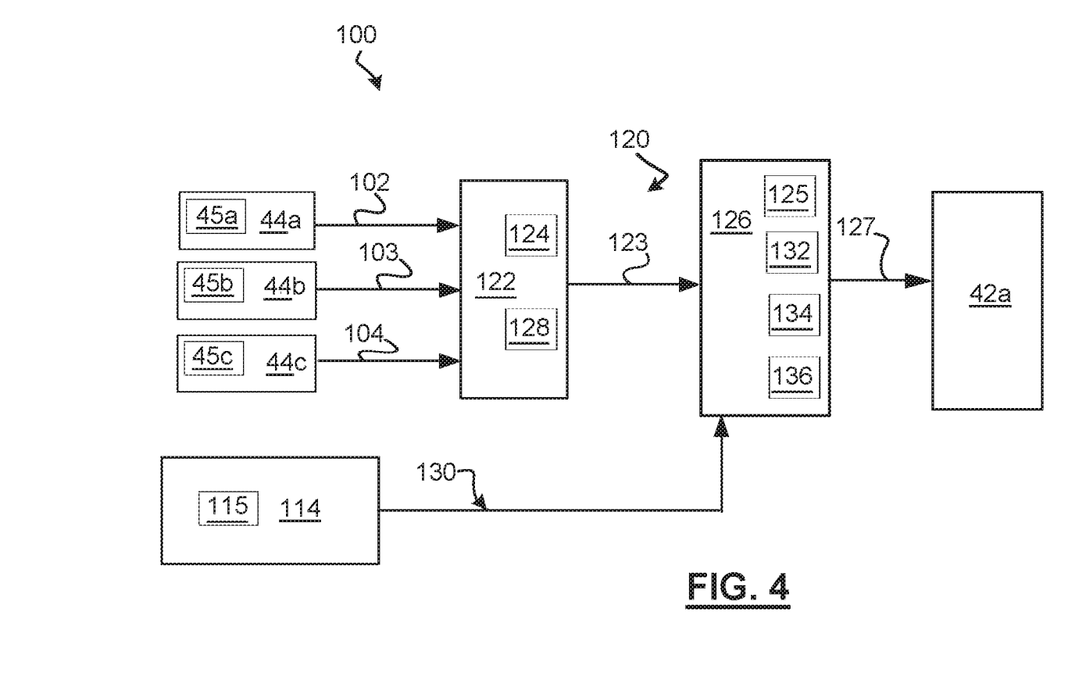
FIG. 4 is a logic block diagram illustrating a part of a control system employing methods, in accordance with various embodiments.

FIG. 4 illustrates another exemplary embodiment of the control system 100. The control system 100 includes the set of controllers 44a, 44b and 44c. In this example, the assigned operation is again, delivery of a command as an input to the actuator device 42a to effect a response. For purposes of the current example, the controllers 44a, 44b and 44c may be substantially identical devices with common program coding for the assigned operation, providing hardware redundancy. The controllers 44a, 44b and 44c may include high performance processors 45a, 45b, 45c. The controllers 44a, 44b, 44c each receive the same inputs, independently determine an output, and provide commands 102, 103 and 104 to carry out the assigned operation. The commands 102-104 may be processed through a multi-stage voting system 120 implemented in the processors 45a, 45b, 45c and the processor 115 in one or more function sub-units or modules as further detailed below. The multi-stage voting system 120 includes first and second stages 122, 126. In the first stage 122, the three commands 102-104 are compared to determine whether they are consistent with one another. In this example, if all three commands 102-104 agree, a signal representing a command 124 is generated, which is one of the three commands 102-104 in agreement. For example, the command 124 may be communicated from the first stage 122 to the second stage 126. In this example, the output command 123 from the first stage 122 is the command 124, which is delivered via a signal to the second stage 126. In another example, if only two of the commands 102-104 agree, command 128 is generated. Command 128 is the same as one of the commands 102-104 from among the two commands in agreement at the first stage 122. In this example, the output command 123 from the first stage 122 is the command 128. The monitor controller 114 separately provides a monitor signal representing the monitor command 130 to the second stage 126 of the voting system 120. With regard to the output from the first stage 122, only one of the commands 124 or 128 will be delivered to the second stage 126 if the conditions are met. If there is no agreement between the commands 102-104, then no command, or a null signal, is issued by the first stage 122.

When the second stage 126 receives a signal representing the command 124 through the output command 123, the command 124 is compared to the monitor command 130. If the monitor command 130 is in agreement with the command 124, then a signal representing a voted command 125 is issued by the second stage 126 as the control signal carrying an output 127 issued to the actuator device 42a. It should be appreciated that the voted command 125 and the command 124 are the same in this example. When the second stage 126 receives command 128 through the output command 123 via the signal from the first stage 122, the command 128 is compared to the monitor command 130. If the monitor command 130 is in agreement with the command 128, then an alternative command 132 is issued by the second stage 126 through the output 127 as the control signal to the actuator device 42a. The alternative command 132 initiates a first level degraded mode of operation of the actuator device 42a. The first level degraded mode effects a low degradation level. When no output is issued from the first stage 122, the second stage 126 issues an alternative command 134 through the output 127 as the control signal to the actuator device 42a. The alternative command 134 initiates a second level degraded mode of operation of the actuator device 42a. The second level degraded mode effects a higher degradation level as compared to the first level degraded mode. If the cause of the no output condition of the first stage is categorized as more significant, as further detailed below, the second stage 126 issues a command 136 through a control signal carrying the output 127 to the actuator device 42a. Through the output 127, the command 136 initiates a third level degraded mode of operation of the actuator device 42a. The third level degraded mode effects a higher degradation level as compared to the second level degraded mode.

In an example where the second stage 126 receives a signal representing either the command 124 or the command 128 and the monitor command 130 is not in agreement with the received command, the second stage 126 issues a signal representing the alternative command 134. The alternative command 134 initiates the second level degraded mode of operation of the actuator device 42a. If the cause of the lack of agreement is categorized as more significant, the second stage 126 issues a signal representing the alternative command 136. The alternative command 136 initiates the third level degraded mode of operation of the actuator device 42a. Accordingly, the multi-stage voting system 120 processes three commands 102-104 in a first stage 122, and processes two commands 130 and either 124 or 128, in a second stage 126 to deliver one of commands 125, 132, 134 or 136 to the actuator device 42a, for control thereof.

Figure 5:
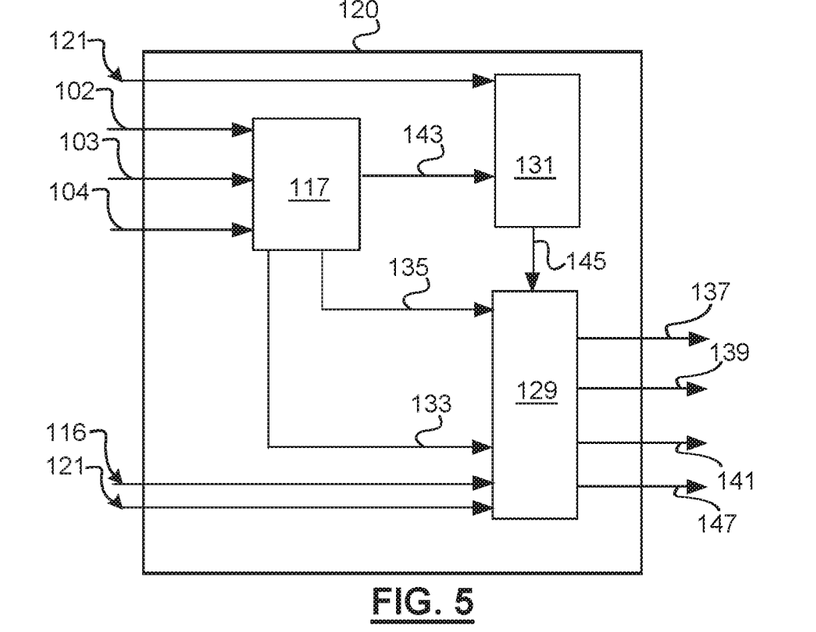
FIG. 5 is a dataflow diagram illustrating a multi-stage voting system that includes a part of the control system of the autonomous vehicle of FIG. 1, in accordance with the embodiments of FIG. 4.

FIG. 5 is a functional block diagram with dataflows that illustrates in one example, various operational aspects of a multi-stage voting system 120. The multi-stage voting system 120 may be considered to implement one or more functional sub-units or modules including a first stage voting module 117 where the first stage 122 is executed, and a second stage voting module 129 where the second stage 126 is executed. In addition, the multi-stage voting system 120 includes an escalation module 131. As can be appreciated, the modules 117, 129 and 131 shown in FIG. 5 may be combined and/or further partitioned to similarly operate according to the functions described herein.

The first stage voting module 117 initiates operation upon receipt of signals representing the commands 102, 103 and 104. In the first stage 122 of the multi-stage voting system 120, the three commands 102-104 are compared in the first stage voting module 117 to determine whether they are consistent with one another. Command signal 133 is provided to the second stage voting module 129 when the first stage voting module 117 determines that the three commands 102, 103 and 104 are in agreement with one another. The monitor controller 114 separately provides a signal representing the monitor command 116 to the second stage voting module 129. When commands represented in signals 133 and 116 are in agreement, the second stage voting module 129 provides a control signal 137 to the actuator device 42a to undertake the voted command. A command signal 135 is provided to the second stage voting module 129 when the first stage voting module 117 determines two of the commands 102, 103 and 104 are in agreement with one another but not with the third command. When commands represented in signals 135 and 116 are in determined to be in agreement, the second stage voting module 129 provides a control signal 139 to the actuator device 42a to undertake the voted command, which in this embodiment is the first level degraded command 132. The data signal 121 is provided to the second stage voting module 129 with degraded commands that are referenced and the command is selected based on correspondence with the monitor command 116. When no signal is provided to the second stage voting module 129 from the first stage voting module 117 but the monitor command 116 is received, the control signal 141 is provided. In this case the control signal 141 represents the alternative command 134 and initiates the second level degraded mode of operation. The first stage voting module 117 separately provides an error signal 143 to the escalation module 131, such as when a signal is not provided to the second stage voting module 129. The error signal 143 represents the cause leading to a lack of agreement between the commands 102, 103 and 104. The escalation module 131 is also provided with the data signal 121, such as with error codes which are referenced for selecting a code corresponding to the error signal 143. The escalation module 131 provides an escalation signal 145 representing the selected code to the second stage voting module 129. The second stage voting module 129 provides a signal 147 when the signal representing the monitor command 116 is received, no command signal is received directly from the first stage voting module 117, and the escalation signal 145 is received. In this case the control signal 147 corresponds to the alternative command 136 and initiates the third level degraded mode of operation.

Figure 6:
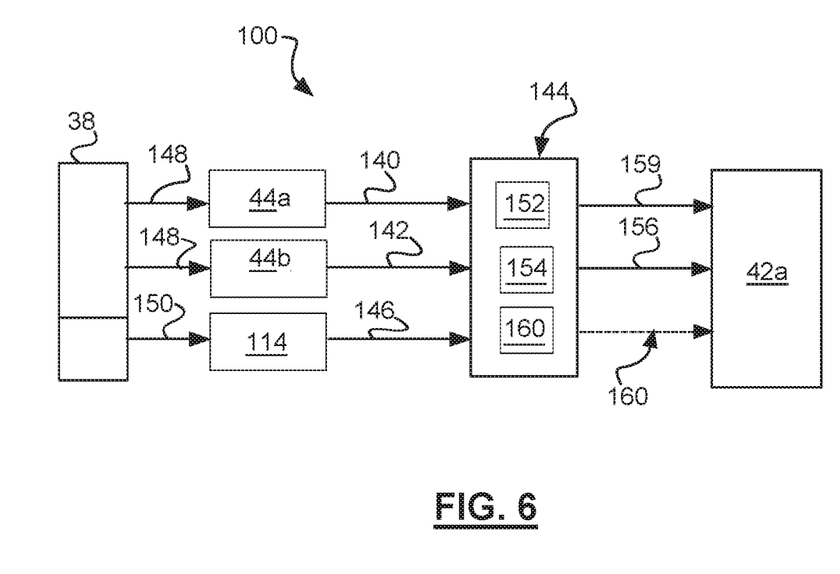
FIG. 6 is a logic block diagram illustrating a part of a control system employing methods, in accordance with various embodiments.

As illustrated in FIG. 6, a number of examples of control system 100 include the controllers 44a and 44b, which deliver signals representing commands 140 and 142 respectively, to a multi-stage voting system 144. The monitor controller 114 delivers a monitor command 146 to the multi-stage voting system 144. The controllers 44a and 44b may be substantially identical devices with common program coding based on common algorithms for the assigned operation, providing hardware redundancy. The controllers 44a, 44b, receive the same inputs, independently determine outputs, and provide commands 140 and 142 to carry out the assigned operation of the control system 100. For example, an input signal 148 may comprise a common input to each controller 44a and 44b from a set of the sensors 46a-46n in the sensor system 38, or may comprise a common input to each controller 44a, 44b from another controller, or may comprise another signal from a common source. The monitor controller 114 separately provides a monitor signal representing the monitor command 146. The monitor controller 114 may have a unique architecture as compared to the controllers 44a and 44b. The monitor controller 114 may use a logically equivalent but diverse set of inputs 150. In a number of examples, the inputs 150 may be provided from a unique set of the sensors 46a-46n in the sensor system 38, or from another unique source. The input signal 150 may comprise separate, independent inputs originating from multiple redundant sources used to measure at least one parameter in common with the sources of the input signal 148.

The multi-stage voting system 144 includes a first stage 152 and a second stage 154 implemented in one or more of the processors 45a, 45b, 45, 115, in one or more function sub-units or modules as further detailed below. In the first stage 152, the command 140 is compared to the command 142. For example, the comparison may be made through the conditional expression: (if |command 140−command 142|<$T_1$), where $T_1$ is a threshold difference determined for the assigned operation, which allows for some insignificant variation between the commands 140, 142. When the commands 140 and 142 are not in agreement, the first stage 152 issues an alternate command 159 as the command to operate the actuator device 42a. The alternate command 159 may be predetermined for the specific situation and may be referenced, such as from a lookup table, or from another data format stored in the memory. When the commands 140 and 142 are in agreement, as a consequent the second stage 154 evaluates whether the command 140 is consistent with the monitor command 146 of the monitor controller 114. The second stage 154 executes the comparison through the conditional expression: (if |command 140−command 146|<$T_2$), where $T_2$ is a threshold difference determined for the assigned operation, which allows for some insignificant variation between the commands 140, 146. When the commands 140 and 146 agree, the second stage 154 issues a signal representing the command 140 as a voted command 156 to the actuator device 42a. When the commands 140 and 146 are not in agreement, as an alternative, the second stage 154 evaluates whether the command 142 is consistent with the monitor command 146 of the monitor controller 114. The second stage 154 executes the comparison through the conditional expression: (if |command 142−command 146|<$T_2$). When the command 142 and the command 146 are in agreement, the second stage 154 issues the command 142 as the voted command 156 to the actuator device 42a. When the commands 142 and 146 are not in agreement, the second stage 154 issues an alternate command 160 as the voted command. The alternate command 160 may be predetermined for the specific situation and may be referenced, such as from a lookup table, or from another data format stored in the memory. In this example, $T_2$ is finer than $T_1$ requiring a closer agreement between the commands 140, 142 and the monitor command 146, as compared to agreement between the command 140 and the command 142. For example, in an application where the commands are voltage commands, $T_1$ may be a fraction of a volt, and $T_2$ may be a smaller fraction of a volt. In other examples, the cause for using alternative command 160 may dictate modified operation of the system which may vary from the normal mode.

As such, the alternative command 160 may be a command for the actuator device 42a to operate in a degraded mode. Accordingly, the multi-stage voting system 144 processes two commands 140, 142 in a first stage 152, and processes up to three commands 140, 142, 146, in a second stage 154, to deliver the voted command 156, the alternative command 159, or the alternative command 160, to the actuator device 42a, for control thereof. The control system 100 uses the advantages of high performance controllers 44a and 44b with the high integrity monitor controller 114.

Figure 7:
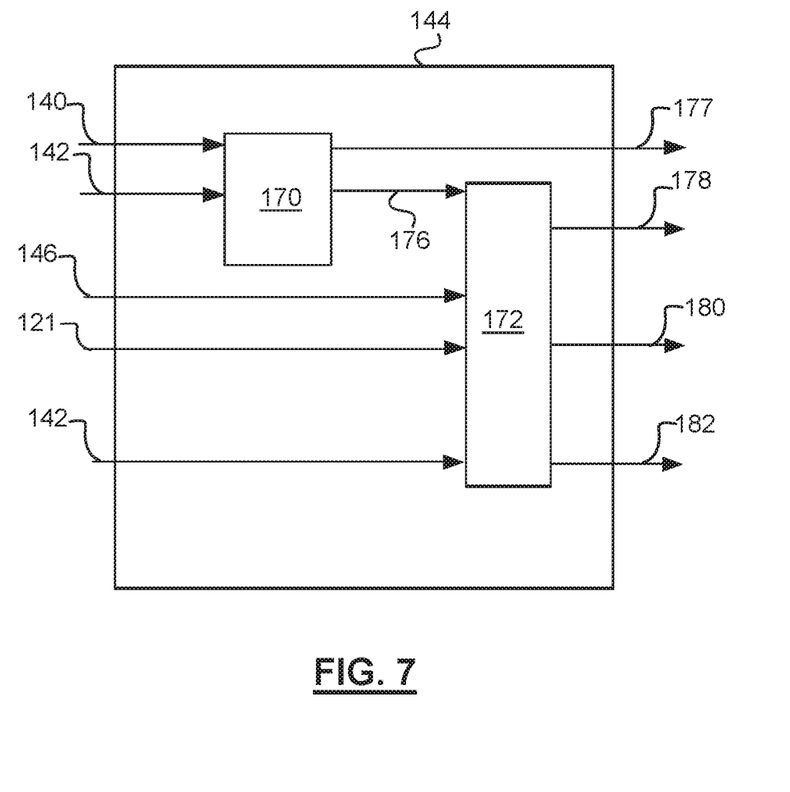
FIG. 7 is a dataflow diagram illustrating a multi-stage voting system that includes a part of the control system of the autonomous vehicle of FIG. 1, in accordance with the embodiments of FIG. 6.

FIG. 7 is a functional block diagram with dataflows that illustrate in one example, various operational aspects of a multi-stage voting system 144. The multi-stage voting system 144 may be considered to implement one or more functional sub-units or modules within one or more of the processors 45a, 45b, 45, 115, including a first stage voting module 170 where the first stage 152 is executed, and a second stage voting module 172 where the second stage 154 is executed. As can be appreciated, the modules 170 and 172 shown in FIG. 7 may be combined and/or further partitioned to similarly operate according to the functions described herein.

The first stage voting module 170 initiates operation upon receipt of the commands 140, and 142 as represented in signals. The signals for the two commands 140 and 142 are compared in a first stage voting module 170 to determine whether the commands are in agreement with one another. When the commands represented in the signals 140 and 142 are not in agreement, the first stage voting module 172 provides the control signal 177. In this case the control signal 177 represents the command 159. Alternatively, command signal 176 is provided to the second stage voting module 172 when the first stage voting module 170 determines that the commands 140 and 142 are in agreement with one another. The monitor controller 114 separately provides a signal representing the monitor command 146 to the second stage voting module 172. When commands represented in the signals 176 and 146 are in agreement, the second stage voting module 172 provides a control signal 178 to the actuator device 42a to undertake the voted command. In this case the control signal 178 represents the command 140. The second stage voting module also receives the command 142. When the command represented in the signals 140 and 146 are not in agreement but the commands represented in the signals 142 and 146 are in agreement, the second stage voting module 172 provides the control signal 180 as an input to the actuator device 42a. In this case the control signal 180 represents the command 142. When the signals 140 and 146 are not in agreement and the signals 142 and 146 are also not in agreement, the second stage voting module 172, provides a control signal 182 provided as an input to the actuator device 42a. For example, the second stage voting module 172 also receives input data 121, and provides the control signal 182 from the available commands existing in the input data 121 and corresponding to the monitor command 146, for delivery to the actuator 42a as the alternate command 160.

Figure 8:
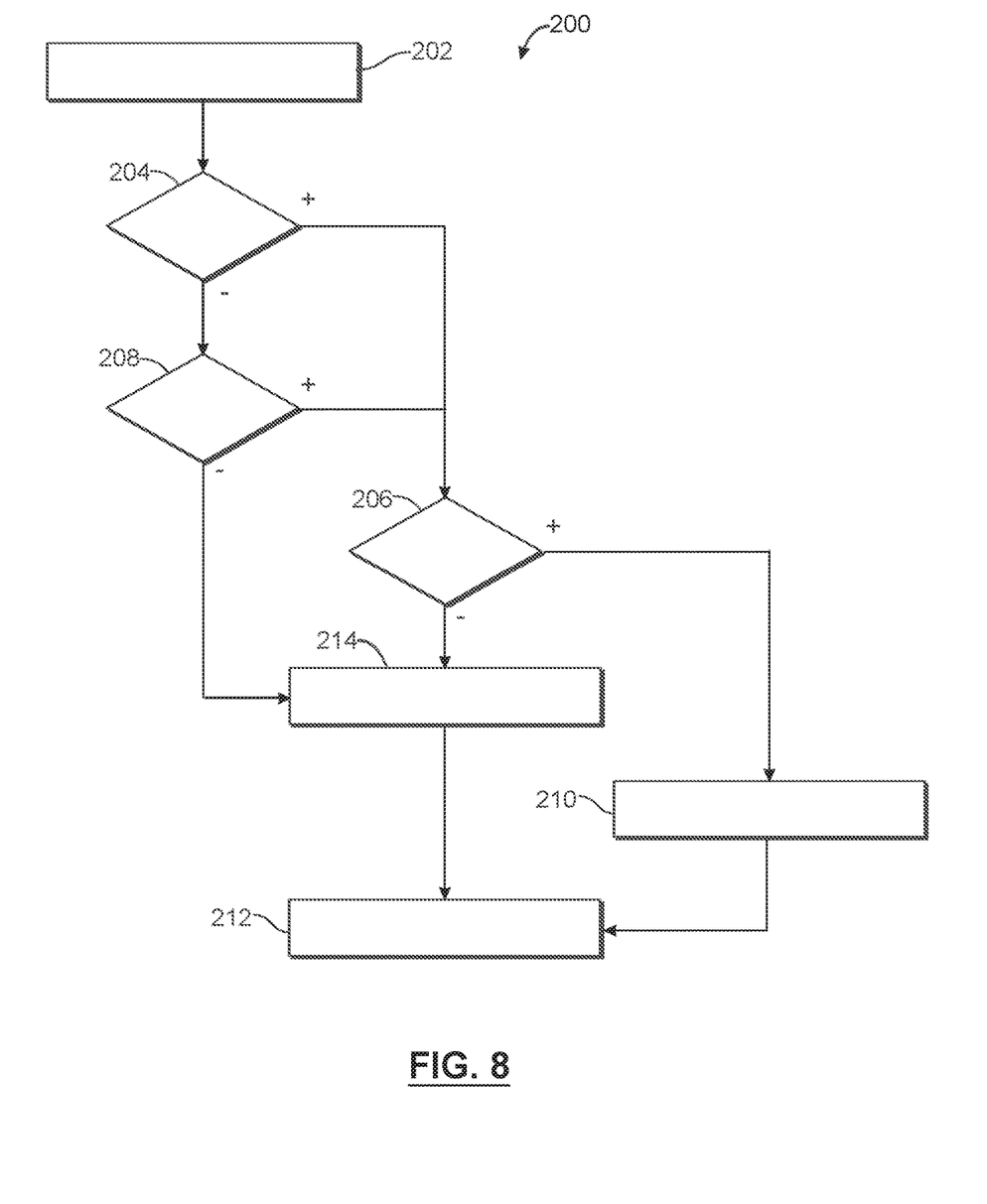
FIG. 8 is a flowchart illustrating a process employing control methods with multi-stage voting control for controlling the autonomous vehicle of FIG. 1, in accordance with various embodiments.

In an exemplary embodiment as illustrated in FIG. 8, a method 200 of implementing the multi-stage voting is initiated at step 202 upon the generation of commands such as by the two or three of the controllers 44a-44n and by the safety monitor 114. The process 200 proceeds to step 204 where the commands from the controllers 44a-44n are compared with one another via one or more of the processors 45a, 45b, 45c, 45 as part of a first stage of the process 200. For example, the comparison may be carried out by the first stage voting module 107, 117 or 170. At step 204 when all the commands received from the controllers 44a-44n are determined to be in agreement with one another, the process 200 proceeds to step 206. When all the commands are not in agreement, the process 200 proceeds to step 208 where, as another part of the first stage, a determination may be made via one or more of the processors 45a, 45b, 45c, 45 as to whether two of three received commands are in agreement with one another. For example, the comparison may be carried out by the first stage voting module 107, 117 or 170. When the determination is positive and two of the three commands are in agreement, the process 200 proceeds to step 206. At step 206 the agreed command of the controllers 44a-44n from step 204 or from step 208 is compared to the command from the safety monitor 114 via one or more of the processors 45a, 45b, 45c, 45, 115. For example, the comparison may be carried out by the second stage voting module 113, 129 or 172. When a positive determination is made and the command of the safety monitor 114 agrees with the agreed command of the controllers 44a-44n, the process 200 proceeds to step 210 where the agreed command from step 206 is issued, such as to operate one of the actuators 42a-42n, and the process 200 ends at step 212. When a negative determination is made at step 206 and the command of the safety monitor 114 is found not in agreement with the voted command from step 204 or 208, the process proceeds to step 214. At step 214 the process 200 accesses the computer readable storage device or media 47 and issues an alternative command corresponding to the command of the safety monitor 114 and the process ends at step 212.

As can be appreciated, the subject matter disclosed herein provides certain enhanced features and functionality in a control system 100. In an exemplary embodiment, the enhanced features and functionality may be added to what may be considered as a standard or baseline autonomous vehicle 10. To this end, a control system, or an autonomous vehicle can be modified, enhanced, or otherwise supplemented to provide the additional features described in more detail below.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A control system comprising:
an actuator device responsive to a voted command, wherein the control system is in communication with the actuator device, and comprising a multi-stage voting system, configured to determine the voted command for the actuator device;
a set of controllers providing a set of commands to the multi-stage voting system;
a monitor controller providing a monitor command to the multi-stage voting system;
wherein the multi-stage voting system comprises logic in the control system with a first stage that compares the set of commands to each other, and a second stage that compares at least one of the set of commands to the monitor command; and
wherein the multi-stage voting system delivers the voted command to the actuator device based on the comparisons made in the first and second stages, the actuator device effecting an operation in response to the voted command.

2. The control system of claim 1 wherein:
the set of commands includes a first command and a second command; and
the first stage is configured to evaluate whether the first and second commands are in agreement with one another.

3. The control system of claim 1 wherein:
the set of commands includes a first command, a second command, and a third command;
the first stage is configured to evaluate whether the first, second and third commands are in agreement with one another;
wherein when all of the first, second and third commands agree with one another, the first stage is configured to deliver a first output command to the second stage; and
wherein when only two of the first, second and third commands agree with one another, the first stage is configured to deliver a second output command to the second stage, the second output command differing from the first output command.

4. The control system of claim 3 wherein:
the second stage is configured to evaluate whether the first output command agrees with the monitor command; and
when the first output command and the monitor command do not agree with one another, the second stage is configured to deliver a degraded command effecting a change in operation of the actuator device relative to that effected from the first and second output commands.

5. The control system of claim 3 wherein:
the second stage is configured to evaluate whether the first output command agrees with the monitor command; and
when the first output command and the monitor command do not agree with one another, the second stage is configured to deliver a predetermined command to the actuator device, wherein the predetermined command is retrieved from a computer readable storage device or media of the control system and is configured to match an operational need of the actuator device.

6. The control system of claim 3 wherein:
the second stage is configured to evaluate whether the first output command agrees with the monitor command within a threshold; and
wherein the threshold is configured to allow variation between the first output command and the monitor command, in evaluating whether the first output command agrees with the monitor command.

7. The control system of claim 1 wherein:
the set of commands includes a first command and a second command;
the first stage is configured to evaluate whether the first and second commands are in agreement with one another;
the second stage is configured to determine whether the first command and the second command are in agreement with the monitor command; and the second stage is configured to issue the second command as the voted command when the first command does not agree with the monitor command and the second command does agree with the monitor command.

8. The control system of claim 7 wherein:

the second stage is configured to issue an alternative command as the voted command when the first command does not agree with the second command, or when the first command does not agree with the monitor command and the second command does not agree with the monitor command.

9. A method of operating a control system to issue a voted command to an actuator device comprising:

providing a first controller, a second controller and a monitor controller wherein the second controller is substantially identical to the first controller;

receiving a first signal from the first controller wherein the first signal represents a first command;

receiving a second signal from the second controller, wherein the second signal represents a second command;

receiving a monitor signal from the monitor controller, wherein the monitor controller is configured different from the first and second controllers, wherein the monitor signal represents a third command;

processing, by a processor, the first and second signals using a multi-stage voting system, wherein the multi-stage voting system includes a first stage and a second stage;

comparing, by the processor in the first stage, the first signal to the second signal;

comparing, by the processor in the second stage, the monitor signal to at least one of the first signal or the second signal; and issuing, when the monitor signal agrees with the first or second signal, a command signal as the voted command from the multi-stage voting system to the actuator device, wherein the command signal corresponds to at least one of the first or second signals.

10. The method of claim 9 comprising:

configuring the first controller with a first program;

configuring the second controller with the first program; and configuring the monitor controller with a second program that is different from the first program.

11. The method of claim 9 comprising:

executing the first stage in a first stage voting module of the processor; and executing the second stage in a second stage voting module of the processor.

12. The method of claim 11 comprising:

providing a command signal from the first stage voting module to the second stage voting module, wherein the command signal represents agreement between the first command and the second command; and issuing an alternative signal from the multi-stage voting system to the actuator device when the first signal does not agree with the second signal, or when the monitor signal is not in agreement with the first or second signal, wherein the alternate signal represents a predetermined command based on an operational need of the actuator device.

13. The method of claim 11 comprising:

providing a third controller;

receiving a third signal from the third controller wherein the third signal represents a fourth command;

comparing, by the processor, the first, second and third signals with one another;

when all of the first, second and third signals agree with one another, issuing a first command signal from the first stage voting module to the second stage voting module; and when only two of the first, second and third signals agree with one another, issuing a second command signal from the first stage voting module to the second stage voting module, wherein the second command signal is different than the first command signal.

14. The method of claim 13 comprising:

issuing an alternative signal from the second stage voting module to the actuator device when the second command signal is issued, wherein the alternative signal is predetermined and stored in the control system.

15. The method of claim 11 comprising:

providing a third controller;

receiving a third signal from the third controller wherein the third signal represents a fourth command;

comparing, by the processor, the first, second and third signals with one another; and issuing an alternative signal from the second stage voting module to the actuator device when none of the first, second and third signals agree with one another, wherein the alternative signal is predetermined and stored in the control system.

16. The method of claim 9 comprising:

comparing, by the processor, the first signal to the monitor signal;

comparing, by the processor, the second signal to the monitor signal, when the monitor signal does not agree with the first signal; and issuing, by the processor, an alternative command to the actuator device when the first signal does not agree with the second signal or when the monitor signal does not agree with the second signal, wherein the alternative signal is predetermined and stored in the control system.

17. The method of claim 9 comprising:

providing a sensor device; and providing a signal from the sensor device to both the first and second controllers.

18. The method of claim 9 comprising:

providing an autonomous vehicle;

providing the actuator device to actuate a vehicle system of the autonomous vehicle;

providing a sensor device on the autonomous vehicle; and operating the vehicle system by the actuator device in response to an input signal from the sensor device, wherein the input signal is processed by the processor through the multi-stage voting system.

19. The method of claim 18 comprising:

providing a third controller;

receiving a third signal from the third controller to the multi-stage voting system, wherein the first, second and third signals are determined based on the input signal;

comparing, by the processor, the first, second and third signals with one another;

when all of the first, second and third signals agree with one another, issuing a first output signal from the first stage to the second stage; and when only two of the first, second and third commands agree with one another, issuing a second output signal from the first stage to the second stage, wherein the second output signal is different than the first output command.

20. A control system with multi-stage voting for an autonomous vehicle comprising:
- a vehicle system operating at least one function of the autonomous vehicle;
- an actuator device communicating with the vehicle system to actuate the vehicle system;
- wherein the control system is in communication with the actuator device, and comprising a multi-stage voting system configured to determine a voted command for the actuator device, the voted command established for control of the autonomous vehicle;
- a set of controllers receiving first inputs from the autonomous vehicle and providing a set of command signals to the multi-stage voting system, wherein the controllers in the set of controllers are substantially identical;
- a monitor controller receiving second inputs from the autonomous vehicle and providing a monitor signal to the multi-stage voting system;
- wherein the multi-stage voting system comprises logic in the control system that has a first stage that compares the set of command signals to each other, and a second stage that compares at least one command signal in the set of command signals to the monitor signal; and
- wherein the multi-stage voting system delivers the voted command to the actuator device based on the comparisons made in the first and second stages.

* * * * *